United States Patent Office 3,532,463

Patented Oct. 6, 1970

3,532,463

SLIGHTLY GRAPHITIZABLE CARBONS AND A METHOD FOR THEIR PRODUCTION

André F. Boyer, Verneuil-en-Halatte, France, assignor to Charbonnage de France, Paris, France, a public institution of France No Drawing. Filed Mar. 13, 1967, Ser. No. 622,433
Claims priority, application France, Mar. 14, 1966, 53,374
Int. Cl. C01b *31/02*
U.S. Cl. 23—209.2 3 Claims

ABSTRACT OF THE DISCLOSURE

Cokes of high reactivity, only slightly or not at all graphitizable and having a resistivity of at least 44,000 μΩ/cm., obtained by incorporating from 10 to 16% by weight of ammonium sulphate in a highly aromatic pitch and subjecting the mixture to carbonization. These cokes are utilized as reducing agents in electrometallurgy, as heating elements using the Joule effect, as granules for furnace resistances or as a raw material for the preparation of active carbons.

The present invention is concerned with hard carbons which are only slightly or not at all graphitizable, together with a method of production of such products.

It is known that so-called low-temperature coal pitches, vegetable substances and certain macro-molecules such as polyvinylidene chloride produce by carbonization non-graphitizable carbons having a high reactivity, low electrical conductivity and a highly developed microporous structure, which makes them valuable in industrial fields such as electro-metallurgy.

On the other hand, the highly aromatic pitches such as pitches derived by distillation of high-temperature coal tars, or cracking bitumens, produce by carbonization, soft and feebly-reactive carbons having low electrical resistivity, only slightly microporous, and yielding graphites by treatment at about 2,500 to 3,000° C.

It has also been shown that by mixing low-temperature pitches with high-temperature pitches, it is possible to obtain carbons having intermediate properties.

Now, the present invention covers a new process by which it is possible to obtain new carbons which are hard and only slightly graphitizable. The invention also covers, by way of new industrial products, the carbons resulting from this process and having a combination of advantageous properties.

It has in fact been found that by proceeding to increasing additions of ammonium sulphate to high-temperature coal tar pitches, it is possible to diminish at will, or even to inhibit totally, the graphitizability of the mixtures thus obtained and of the carbons prepared from these mixtures.

In accordance with the preferred embodiment, 10–16% by weight of ammonium sulphate is incorporated in a highly aromatic pitch derived by distillation of high-temperature coal tars, and the mixture is subjected to carbonization. The carbon produced, which is only slightly or not at all graphitizable, has an electrical resistivity of at least 44,000 microohms per centimeter.

By carbonization of such mixtures of tars or pitches with ammonium sulphate, there can also be obtained a whole series of new isotropic products having good mechanical properties, high resistivity, and possessing specific surfaces greater than those of cokes obtained without the addition of ammonium sulphate.

It is surprising that the addition of ammonium sulphate only modifies very slightly the quantity of ash. This range of qualities renders these products particularly suitable for industrial applications, for example as reducing agents in electro-metallurgy, as heating elements using the Joule effect in certain types of furnaces, as granules for resistances in graphitation furnaces, and as raw materials in the preparation of active carbons.

The particular features of the new carbons obtained in accordance with the invention will be illustrated in the examples which follow, given by way of explanation and not in any limitative sense.

In order to show more clearly the effect of additions of increasing quantities of ammonium sulphate, the carbonizations have all been carried out at the same temperature, namely 1,000° C. It will however be obvious to those skilled in the art that for certain applications, coking at a different temperature selected from the range of temperatures appropriate to carbonization will be more favourable.

EXAMPLE 1

There is added 10.7% (calculated by weight with respect to the mixture) of ammonium sulphate to a high-temperature commercial pitch having a softening point KS 78° C., and which is a distillation residue of a tar obtained by carbonization in a coke furnace of a mixture with a base of Lorraine coal, normally resulting in an easily graphitizable coke.

This mixture is carbonized at a speed of 1° C. per minute in a neutral atmosphere up to 550° C., and is then calcined at a heating speed of 3° C. per minute up to 1,000° C. and is maintained at that temperature for half an hour.

There is obtained a coke of intermediate graphitizability between that of a hard coke and that of a soft coke, the main characteristics of which are as follows:

| | Ash Percent | C Percent | H Percent | S Percent | N Percent | O Percent | $\rho$(μΩ×cm.) | S(m.²/g.) |
|---|---|---|---|---|---|---|---|---|
| Coke obtained without addition of sulphate | 0.35 | 98.0 | 0.85 | 0.18 | 0.66 | 0.50 | 23,500 | 13 |
| Coke obtained from the mixture with 10% of sulphate | 0.30 | 97.5 | 0.68 | 0.44 | 0.74 | 0.34 | 44,000 | 17 |

It is seen that the electrical resistivity $\rho$ (measured on a powder having a granular size less than 100μ, compressed with a pressure of 5,000 bars) is practically doubled by the addition of the sulphate in the proportion indicated. There should also be emphasized the low quantity of ash with the pitch coke mixed with sulphate, which makes it suitable for use as a raw material for the preparation of carbon materials of very high purity.

It is also known that microscopic examination by polarized reflected light of a polished section of coke gives very good information on the structural properties of the carbon, and more particularly on its graphitizability. It is known that carbon becomes less graphitizable as the anisotropy of its optical properties, for example its reflecting power, is reduced. It so happens that the pitch coke with 10.7% of sulphate has a relatively low optical anisotropy, which confirms its low graphitizability and classifies it in the family of hard carbons.

This example shows that the addition of 10% of sulphate (expressed by weight with respect to the mixture) partially inhibits the graphitizability of the pitch coke and results in a coke of great purity, good mechanical properties and high electrical resistivity. These feebly graphitizable carbons are particularly suitable for example for the manufacture of electric heating elements; similarly, they may be applied directly in the form of granules as the constituent of a resistor in graphitation furnaces, or in any other form as the main or secondary constituent employed in the manufacture of products in which the particular qualities of the carbons of the invention are desired.

EXAMPLE 2

The operation is carried out as in Example 1, but with a mixture in which the content of ammonium sulphate reaches 12.3%. Graphitizability is totally inhibited as shown by the microscopic examination of the coke carbonized at 1,000° C. The other characteristics confirm without ambiguity the inhibition of graphitizability:

| | | |
|---|---|---|
| Ash | percent | 0.37 |
| C | do | 97.0 |
| H | do | 0.63 |
| S | do | 0.70 |
| N | do | 0.68 |
| O | do | 0.43 |
| $\rho(\mu\Omega \times cm.)$ | | 80,000 |
| $S(m.^2/g.)$ | | 37 |

These characteristics are quite similar to those known for coke obtained from a low-temperature pitch resulting from the low-temperature carbonization in a fluidized bed of a low rank coal.

The type of carbon thus obtained is very reactive with respect to oxidizing agents and has a highly developed sub-microscopic porosity. Furthermore, microscopic examination reveals an isotropic structure.

EXAMPLE 3

If an excess of sulphate is employed with respect to the quantity necessary for the inhibition of graphitizability of pitch coke, it is found that certain properties of the carbon continue to develop.

For example, when the mixture contains 15.3% of ammonium sulphate, the characteristics of the coke carbonized at 1,000° C., as indicated in the previous examples, are as follows:

| | | |
|---|---|---|
| Ash | percent | 0.45 |
| C | do | 96.7 |
| H | do | 0.94 |
| S | do | 0.92 |
| N | do | 0.86 |
| O | do | 0.69 |
| $\rho(\mu\Omega \times cm.)$ | | 240,000 |
| $S(m.^2/g.)$ | | 96 |

The electrical resistivity of the coke is very much higher than that of the carbonized products usually employed and even than that of industrial carbons of high resistivity.

The surface accessible to a gas at ambient temperature is also very large, since it approaches 100 sq. m. per gram.

The cokes obtained following Examples 2 and 3, like those of Example 1, find many applications in industry by virtue of the combination of the properties and characteristics which they offer.

It will furthermore be understood that the present invention has only been described purely by way of explanation and not in any limitative sense and that any useful modification may be made thereto without thereby departing from its scope.

I claim:

1. A method for the production of carbon which is only slightly or not at all graphitizable, comprising:
mixing components consisting essentially of a minor proportion of ammonium sulphate and a major proportion of a highly aromatic pitch, and
carbonizing said mixture.

2. A method for the production of carbon which is only slightly or not at all graphitizable, comprising:
mixing components consisting essentially of 10–16% by weight of ammonium sulphate with the remainder of a pitch derived by distillation of high-temperature coal tars, and
carbonizing said mixture by heating at an elevated temperature to produce carbon having a resistivity of at least 44,000 microohms per centimeter.

3. Carbon which is only slightly or not at all graphitizable and having an electrical resistivity of at least 44,000 microohms per centimeter, obtained by mixing components consisting essentially of 10–16% by weight of ammonium sulphate with a highly aromatic pitch, and subjecting said mixture to carbonization.

References Cited

UNITED STATES PATENTS

| | | | |
|---|---|---|---|
| 617,979 | 1/1899 | Acheson | 252—502 |
| 1,911,279 | 5/1933 | Hochstetter | 252—502 |

FOREIGN PATENTS 1,063,076 12/1957 Germany.

DOUGLAS J. DRUMMOND, Primary Examiner

U.S. Cl. X.R.

23—209.4; 252—502